US006876646B1

(12) United States Patent
Dore et al.

(10) Patent No.: US 6,876,646 B1
(45) Date of Patent: Apr. 5, 2005

(54) COLLECTING INFORMATION BEFORE A CALL

(75) Inventors: Tammy S. Dore, Richardson, TX (US); Steven W. Craycraft, Plano, TX (US); Pratima Sharma, Plano, TX (US); Joseph J. Deutsch, Frisco, TX (US)

(73) Assignee: Nortel Networks Limited, St. Laurent (CA)

( * ) Notice: Subject to any disclaimer, the term of this patent is extended or adjusted under 35 U.S.C. 154(b) by 483 days.

(21) Appl. No.: 09/713,888

(22) Filed: Nov. 16, 2000

(51) Int. Cl.[7] .............................................. H04L 12/66
(52) U.S. Cl. ........................ 370/352; 370/389; 370/401
(58) Field of Search ................................ 370/352–356, 370/389, 400, 401, 426, 373, 384, 385, 410, 496

(56) References Cited

U.S. PATENT DOCUMENTS

| 6,404,870 | B1 | * | 6/2002 | Kia et al. | .............. | 379/144.01 |
| 6,418,210 | B1 | * | 7/2002 | Sayko | ................... | 379/142.15 |
| 6,765,912 | B1 | * | 7/2004 | Vuong | ..................... | 370/395.2 |

OTHER PUBLICATIONS

S. Donovan; "The SIP INFO method"; http://www.cs.columbia.edu/sip/drafts/sip/draft–ietf–sip–info–method–00.txt; Oct. 1999.*
Culppeper, "SIP INFO Method for Event Reporting", http:www1.cs.columbia.edu/sip/drafts/draft–culpepper–sip–info–event–00.txt.*
Choudhuri, "SIP INFO method for DTMF digit transport and collection", http://www.alternic.org/drafts/drafts–c–d/draft–choudhurisip–info–digit–00.html.*
Girard D. G. and Hoffpauir S. "SIP–Telephony Service Interface Overview", http://www1.cs.columbia.edu/sip/drafts/SIP–TSI1.0.doc.*
Fernando Cuervo et al., Media Gateway Control (Megaco) Working Group, "Megaco Protocol," Dated Oct. 1999, pp. 1–151.
J. Postel; Request For Comments 768, "User Datagram Protocol", Aug. 28, 1980, pp. 1–3.
Information Sciences Institute, Request for Comments 791, "Internet Protocol–Darpa Internet Program, Protocol Specification," Sep. 1981, pp. 1–48.
Information Sciences Institute, Request For Comments 793, "Transmission Control Protocol—Darpa Internet Program, Protocol Specification," Sep. 1981, pp. 1–91.
S. Deering, et al., Network Working Group, Request For Comments 2460, "Internet Protocol, Version 6 (IPv6) Specification," Dec. 1998, pp. 1–36.
M. Handley, et al., Network Working Group, Request For Comments 2543, "SIP: Session Initiation Protocol", Mar. 1999, pp. 1–153.
M. Arango et al., Network Working Group, Request For Comments 2705, Entitled "Media Gateway Control Protocol (MGCP) Version 1.0", Dated Oct. 1999, pp. 1–118.
Recommendation Q. 1901, Bearer Independent Call Control Protocol, Dated Sep. 12, 1999, pp. 1–71.

(Continued)

*Primary Examiner*—Chi Pham
*Assistant Examiner*—Anh-Vu Ly
(74) *Attorney, Agent, or Firm*—Trop, Pruner & Hu, P.C.

(57) ABSTRACT

A method and apparatus are provided. The method comprises receiving a call request from a first media gateway controller to a second media controller over a network. The method further comprises requesting information from the first media gateway controller. The method also comprises receiving the information before establishing a bearer path over the network.

42 Claims, 4 Drawing Sheets

OTHER PUBLICATIONS

V. Bharatia et al., *Internat Draft; draft–culpepper–sip–info–event–00.txt; SIP INFO Method For Event Reporting;* Internet Engineering Task Force, Apr. 2000, pp. 1–10.

C. Huitema et al., *An Architecture For Residential Internet Telephony Service;* IEEE Inc., New York, vol. 13, No. 3, May 1999, pp. 50–56.

Zimmerer, *SIP+ (Inter MGC Protocol);* Edition 0.0; Draft 0.1, Dec. 1998, pp. 1–20.

T. Taylor et al., *Megaco/H.248: A New Standard For Media Gateway Control;* IEEE Service Center, Piscataway, NJ, vol. 38, No. 10, Oct. 2000, pp. 124–132.

L–P. Anquetil et al., *Media Gateway Control Protocol And Voice Over IP Gateways. MGCP and VolP Gateways will Offer Seamless Interworking Of New VolP Networks With today's Telephone Networks.;* Electrical Communication, Alcatel, Brussels, BE, Apr. 1999, pp. 151–157.

\* cited by examiner

COLLECTING INFORMATION BEFORE A CALL

TECHNICAL FIELD

The invention relates generally to collecting information to establish a call, and, more particularly, to collecting digits to before or during a call.

BACKGROUND

Users may employ a variety of communications networks to enable call sessions between end points, such as telephones, computer systems fitted with voice processing capabilities, and other devices. For example, two common types of networks are circuit-switched networks and packet-based networks. In a circuit-switched network, a dedicated, end-to-end circuit connection is established for the duration of each call, which works well for communications that are generally continuous, such as speech between two end users.

In contrast, packet-based networks typically communicate by use of packets sent in a series of bursts. The packets are generally communicated when needed, without an explicit connection defined between the two end points. Instead, routing is based on addresses carried in the packets. Examples of packet-based networks include Internet Protocol (IP) networks and Asynchronous Transfer Mode (ATM) networks or Frame Relay networks. In IP networks, which are typically connectionless-oriented networks, packets or other units of data are injected into the network, where the packets travel independently over any path (and possibly over different paths) to a destination point. The packets may even arrive out of order. In ATM networks, which are typically connection-oriented networks, a virtual circuit or connection is established between two end points, and packets are received in the same order in which they were transmitted.

With the availability of a variety of different types of communications networks, inter-network communications has become desirable. Developers, for example, have introduced media gateway controllers (MGCs) to connect circuit-switched networks and packet-based networks through media gateways. Media gateway controllers in general manage call signaling conversion and call routing across the circuit-switched and packet data network.

A call, for example, may originate from a first terminal connected to a first circuit-switched network with the destination being a second terminal connected to a second circuit-switched network, with the two circuit-switched networks connected by a packet-based network. In one embodiment, the interface between the first circuit-switched network and packet-based network may be controlled by one media gateway controller, while the interface between the second circuit-switched network and packet-based network may be controlled by another media gateway controller.

Interconnection of various types of networks has in some ways complicated the task of completing a call placed over the packet-based network, particularly when two or more media gateway controllers are involved. For example, it may not be possible to collect digits (between two or more MGCs) unless a bearer path is first established over the packet-based network between the originating and terminating media gateways. Digit collection generally refers to collecting digits in response to a prompt, which typically occurs after a user dials a destination number. Examples of collecting digits may include collecting caller personal identification numbers (PIN), passwords, phone numbers, credit card numbers, phone card numbers, and the like for the purposes of authenticating the user and/or to identify the destination.

As mentioned above, collecting digits typically involves establishing a bearer path over the packet-based network. However, establishing a bearer path before the digits have been collected may result in unnecessary consumption of resources, particularly since the receiving MGC may not be able to correctly identify the terminating media gateway until the desired digits have been collected. As such, unnecessary re-routing (sometimes referred to as hairpinning) may result in completing the call.

A need thus exists for an efficient method and apparatus of collecting information, such as digits, to establish a call or during a call.

SUMMARY

In general, according to one embodiment, a method comprises receiving a call request from a first media gateway controller to a second media controller over a network. The method further comprises requesting information from the first media gateway controller. The method also comprises receiving the information before establishing a bearer path over the network.

Some embodiments may have one or more of the following advantages. An efficient method and apparatus are provided for collecting information, such as digits, to establish inter-media gateway controller calls. Creation of a bearer path between the originating network and the terminating network over a data network may no longer be necessary before collecting the desired information. In one embodiment, having access to the digits before the bearer path is established over the data network may reduce the number of hairpinnings, thereby resulting in savings of network resources.

Other features and advantages will become apparent from the following description, from the drawings, and from the claims.

DETAILED DESCRIPTION

In the following description, numerous details are set forth to provide an understanding of the present invention. However, it will be understood by those skilled in the art that the present invention may be practiced without these details and that numerous variations or modifications from the described embodiments may be possible.

Figure 1:
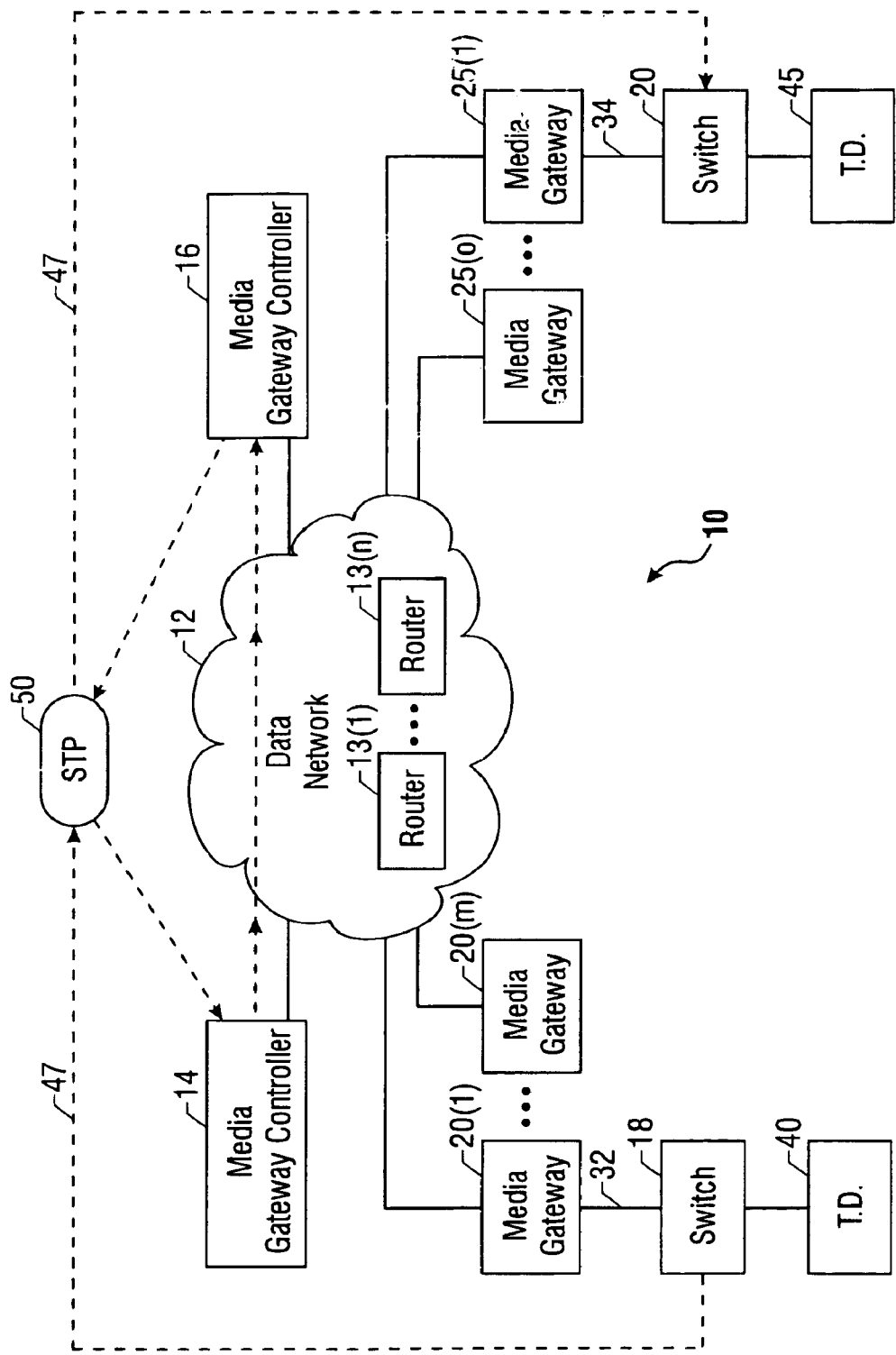
FIG. 1 is a block diagram of an embodiment of a communications system in accordance with the present invention.

Referring to FIG. 1, a communications system 10 includes a packet-based network 12 that may have one or more routers 13 (1–n) or switches (not shown). In one embodiment, the packet-based network 12 is an Asynchronous Transfer Mode (ATM) network. The ATM standard is established by the International Telegraph and Telephone Consultative Committee Communications (CCITT) Standards Organization. In an ATM network, cells are used to communicate information. The transport of ATM cells does not occur periodically with respect to some fixed timing reference; instead, ATM packets arrive and are processed across the network randomly since there is no specific timing associated with ATM traffic.

As an alternative to ATM networks, the packet-based network 12 can be a connectionless, packet-switched network, such as an Internet Protocol (IP) network. A version of IP is described in Request for Comments (RFC) 791, entitled "Internet Protocol," dated September 1981. Another version of IP is IPv6, as described in RFC 2460, entitled "Internet Protocol, Version 6 (IPv6) Specification," dated December 1998.

As used here, a "network" or "data network" may refer to one or more communications networks, channels, links, or paths and systems or devices (such as routers) used to route data over such networks, channels, links, or paths.

The communications system 10 includes media gateway controllers (MGCs) 14, 16 coupled to the packet-based network 12. The media gateway controllers 14 and 16 may be capable of controlling one or more media gateways (MGs) 20(1–m) and 25(1–o), respectively, over the packet-based network 12. The media gateways 20(1) and 25(1) are interconnected to respective networks 32 and 34, that in one embodiment are circuit-switched networks. The media gateways 20(1) and 25(1) thus provide for interworking between circuit-switched networks 32 and 34 and the packet-based network 12. Examples of circuit-switched networks 32 and 34 include Integrated Services Digital Networks (ISDN), T-carrier (e.g., T-1, T-3, E-1) networks, plain old telephone system (POTS), ISDN user part circuitry, per trunk signaling (PTS), or switching interfaces covered in American National Standards Institute (ANSI) or Telecommunication Standardization Sector of the International Telecommunications Union (ITU-T). In one embodiment of the circuit-switched networks 32 and 34, a time-division multiplex (TDM) circuit-switching scheme is used to create a dedicated circuit between any two devices for the duration of the connection. TDM divides the bandwidth down into fixed time slots each with its own fixed capacity. Each attached device on the network is assigned a fixed portion of the bandwidth using one or more time slots.

Each of the circuit-switched networks 32 and 34 is connected to respective switches 18 and 20. Examples of the switches 18 and 20 include tandem switches, intermediate exchange switches, or central office. In one embodiment, the switches 18, 20 may be TDM switches. The switches 18 and 20 are connected by lines to respective terminals, which, in one embodiment, may be telephones 40 and 45.

In one embodiment, the communications system 10 utilizes a signaling network 47 to exchange messages between network nodes to establish, maintain, and terminate telephony communications. In one embodiment, the signaling network 47 may be a signaling system #7 (SS7) network. The SS7 network allows signaling data (e.g., data associated with call setup, billing, authentication, and so forth) to be exchanged between telephone switches (both wireline and wireless) and other telephony elements. The SS7 architecture includes several network nodes, including signal transfer point (STP) 50. The STP 50 acts as a hub for routing signaling messages, and may perform global title translation, a procedure by which the destination signaling point is determined from digits present in the signaling message (e.g., the dialed telephone number, calling card number, or subscriber mobile identification number).

In one embodiment of the present invention, and as is described in more detail below, it is possible to collect information (e.g., digits) for inter-media gateway controller calls without first establishing a bearer path connection across the packet-based network 12. Inter-MGC calls, as utilized herein, refer to calls that originate on one MGC (hereinafter referred to as the "ingress MGC") and terminate at another MGC (hereinafter referred to as the "egress MGC"). A call that is placed from the terminal device 40 to terminal device 45 through the MGCs 14, 16 is one example of an inter-MGC call. Collecting information, such as (DTMF) digits, refers to prompting and collecting information from a user, after the user has entered a destination number.

Examples of collecting information may include collecting PINs, extension numbers, credit card numbers, passwords, and the like after the user has dialed the destination number. In alternative embodiments, collecting the information may include collecting network access information (e.g., information to see if network access is allowed) or billing information (e.g., billing information for access to the network). In yet another embodiment, collecting the information may include collecting information, such as digits, to reoriginate a call back to a provider to establish new calls. Thus, in one embodiment, digits may be collected before establishing a call or during a call.

Once the digits have been collected by the egress MGC from the ingress MGC, a call session may be established between terminal devices over the circuit-switched network and the packet-based network. The combination of the calls over the circuit-switched and packet-based networks make up the call session between two terminals. The terminals involved in a call session can be a first terminal coupled to the circuit-switched network 32 and a second terminal coupled to the circuit-switched network 34. In such a call session, call traffic crosses through both gateways 20 (1) and 25 (1) and the packet-based network 12.

Figure 2:
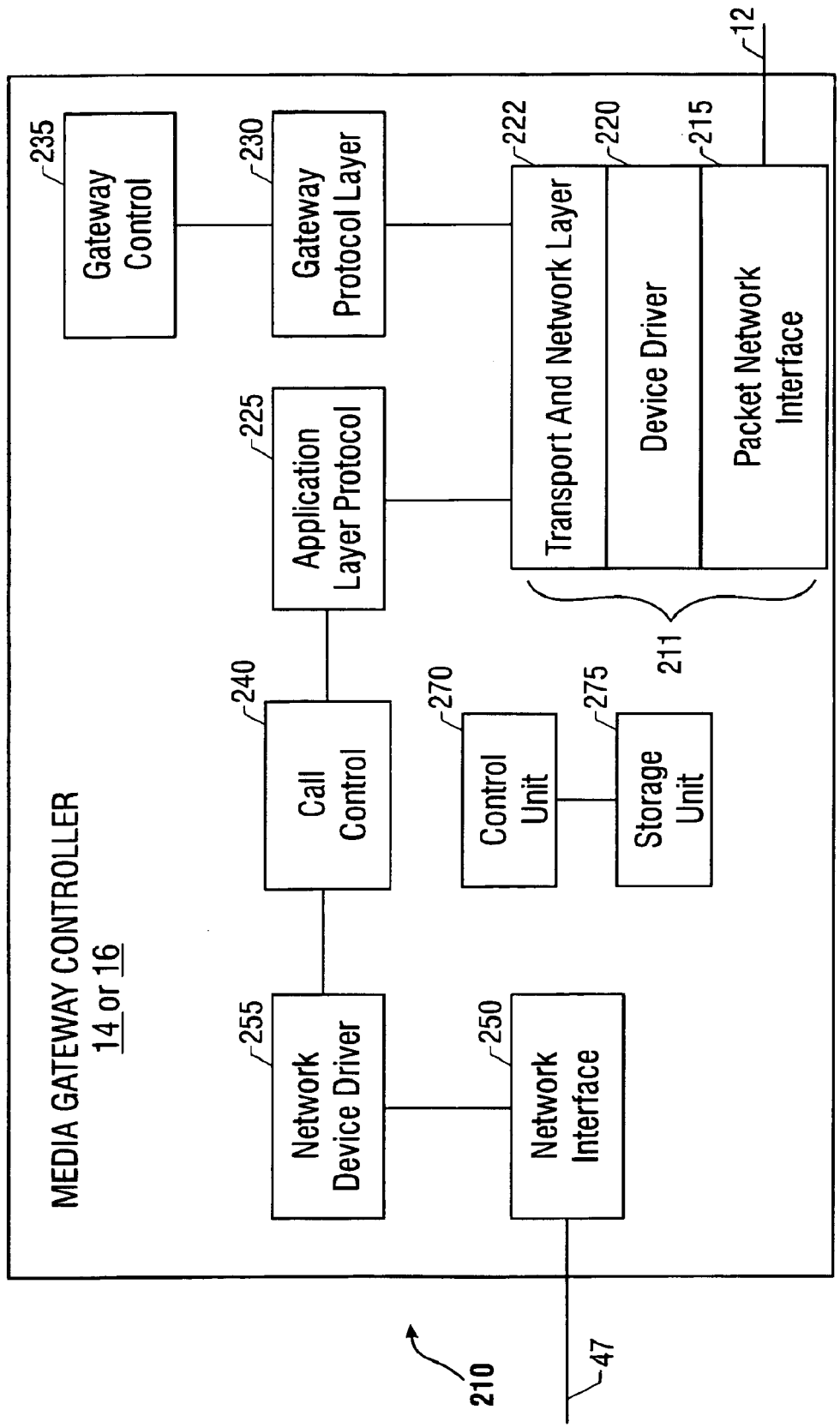
FIG. 2 is a block diagram of a media gateway controller in accordance with one embodiment of the present invention that may be employed in the communications system of FIG. 1.

Referring now to FIG. 2, a media gateway controller 210 in accordance with one embodiment of the present invention is illustrated. The media gateway controller 210 may, in one embodiment, be implemented as the media gateway controller 14 and/or 16 of FIG. 1. The media gateway controller 210 includes a protocol stack 211 that has a packet network interface 215 for interfacing with the packet-based network 12. Above the network interface 215 are several layers, including a device driver layer 220, and a transport and network layer 222.

The transport and network layer 222 may include a TCP/IP or UDP/IP stack. TCP is described in RFC 793, entitled "Transmission Control Protocol," dated September 1981; and UDP is described in RFC 768, entitled "User Datagram Protocol," dated August 1980. TCP and UDP are transport layers for managing connections between network elements over an IP network. In an alternate embodiment, the protocol layer may include an ATM protocol stack (not shown). The ATM protocol stack may include a physical layer, an ATM layer, and an ATM adaptation layer (AAL). The physical layer specifies the physical and electro-optical interfaces of the transmission media on both the transmit and receive sides, and may also handle frame generation, frame adaptation, cell (or packet) delineation, header error control, and cell rate decoupling. The ATM layer may multiplex cells (or packets), select appropriate VPIs and VCIs, generate headers, and perform flow control. The AAL may perform segmentation and reassembly tasks.

If the packet-based network 12 is an IP network, the application layer protocol 225 may, in one embodiment, be a Session Initiation Protocol for Telephony (SIP-T) protocol. The SIP-T protocol is an extension of the existing Session Initiation Protocol (SIP), which is described in RFC 2543, entitled "Session Initiation Protocol," dated March 1999. The "SIP-T" protocol, as utilized herein, may include any protocol, such as the SIP protocol, that is capable of encapsulating ISUP messages for establishing calls. SIP-T protocol may be used as an application control protocol to carry information over the packet-based network 12 from an ingress media gateway controller (e.g., MGC 14) to an egress media gateway controller (e.g., MGC 16), or vice versa. In accordance with one embodiment of the present invention, the SIP-T protocol is utilized by the egress MGC to retrieve information (e.g., digits) from the ingress MGC. Upon receipt of the appropriate SIP-T messages, the egress MGC can establish a bearer path across the packet-based network 12 in order to complete the call.

SIP-T protocol is capable of supporting public switched telephone network (PSTN) signaling transparency by encapsulating ISDN user part (ISUP) messages within SIP methods. The ISUP is part of the Signaling System #7 (SS7) protocol stack and defines the protocol and procedure used to set up, manage, and release trunk circuits that carry voice and data over a circuit-switched network, such as the circuit-switched network 32 or 34. SS7 utilizes out-of-band signaling to establish, manage, and release calls. Out-of-band signaling does not take place in the same path as the bearer traffic (e.g., voice traffic).

In an alternate embodiment, if the packet-based network 12 is an ATM network, the application layer protocol 225, for example, may be the Bearer Independent Call Control (BICC) protocol, which is an adaptation of narrow band ISDN user part for the support of narrow band ISDN services. BICC provides call control signaling that is independent of the bearer technology and signaling transport technology used. BICC is defined by Recommendation Q.1901 from the International Telecommunication Union (ITU).

The media gateway controller 210 includes a gateway protocol layer 230 for communicating with the media gateways 20(1–m) and 25 (1–o). In one embodiment, the gateway protocol layer 230 may be the media gateway control (MEGACO) protocol, as described in Internet draft, entitled "MEGACO Protocol," dated April 2000. The MEGACO protocol is also referred to as the H.248 protocol. In an alternate embodiment, the gateway protocol layer 230 may be the media gateway control protocol (MGCP), as described in Internet draft, entitled "Media Gateway Control Protocol (MGCP), version 1.0," dated October 1999. MGCP messages are typically transmitted over UDP across the packet-based network 12. MGCP, for example, provides basic commands such as CreateConnection, ModifyConnection, and DeleteConnection for requesting establishment, modification, and deletion of one or more connections, respectively. In yet another alternative embodiment, the gateway protocol layer 230 may be the Simple Gateway Controller Protocol (SGCP) or the Internet Protocol Device Control (IPDC).

The media gateway controller 210 also includes a network interface 250 that is coupled to a signaling network 47. In one embodiment, the signaling network may be an SS7 network. In an alternative embodiment, the signaling network 47 may be a basic rate interface (BRI) or primary rate interface (PRI), which are types of ISDN interfaces. A device driver 255 layer is provided that interacts the network interface 250.

The media gateway controller 210 includes a gateway control element 235 and a call control element 240. The gateway control element 235 communicates with media gateways 20(1–n) and 25(1–o) using the gateway protocol layer 230 over the packet-based network 12. The call control element 240, in one embodiment, encapsulates messages from the signaling network 47 and provides the encapsulated message to other media gateway controllers over the packet-based network 12. The media gateway controller 210 further includes one or more control units 270 on which various software modules or routines are executable. One or more storage units 275 are accessible by the control units 270 to store data and instructions.

Figure 3:
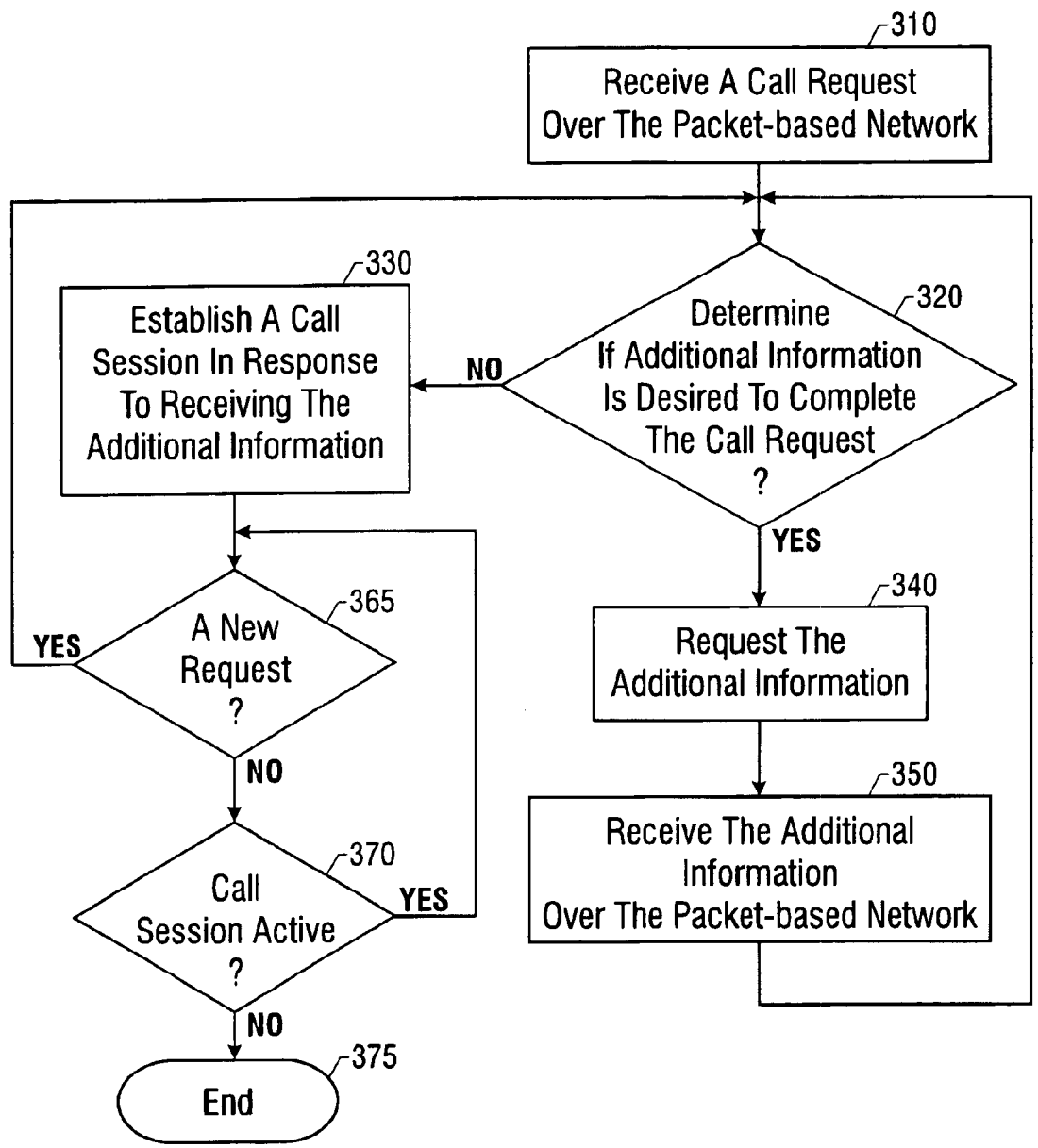
FIG. 3 is a flow diagram of a method in accordance with one embodiment of the present invention that may be implemented in the communications system of FIG. 1.

Referring now to FIG. 3, a method in accordance with one embodiment of the present invention is illustrated for collecting information (e.g., digits) for inter-MGC calls. For illustrative purposes, the method of FIG. 3 is described in the context of a call that originates from the terminal device 40 and terminates at the terminal device 45. In the illustrated example, since the call originates from the MGC 14 and terminates with the MGC 16, the MGC 14 is the ingress MGC and the MGC 16 is the egress MGC. In one embodiment, when a user initiates a call from the terminal device 40, the call control element 240 (see FIG. 2) of the ingress media gateway controller 14 receives an ISUP initial address message (IAM) from the switch 18 over the signaling network 47. The IAM includes the originating point code, destination point code, circuit identification code, dialed digits, and other information. In response to the ISUP IAM message from the originating switch 18, assuming that the packet-based network 12 is an IP network, the control element 240 of the ingress MGC 14 encapsulates an ISUP IAM in a SIP-T Invite message and sends the SIP-T Invite to indicate that the receiving node (egress MGC 16) is being invited to participate in a communications session. In an alternative embodiment, if the packet-based network 12 is an ATM network, in response to the ISUP IAM message, the call control element 240 of the ingress MGC 14 generates and sends a BICC IAM message to the egress MGC 16.

The method of FIG. 3 begins at block 310, wherein the egress MGC 16 receives a call request over the packet-based network 12 from the ingress MGC 14. In one embodiment, the call request may be the SIP-T Invite request, if the packet-based network 12 is an IP network. Alternatively, if the packet-based network 12 is an ATM network, the call request may be the BICC IAM message. At block 320, the egress media gateway controller 16 determines if additional information, such as digits, is desired from the caller to complete the call request. If no additional information is desired, the egress media gateway controller 16, through the media gateway 25(1), completes the call to the terminal device 45 at block 330.

If, at the block 320, the egress MGC 16 determines additional information is desired to complete the call request, then, at block 340, the egress MGC 16 requests the additional information from the ingress MGC 14 over the packet-based network 12. In one embodiment, if the packet-based network 12 is an IP network, the egress MGC 16 sends a SIP-T message to the ingress MGC 14, requesting the additional information. In one embodiment, if the additional informational information sought is additional digits (to complete the call), the SIP-T message may include a digit map, which is a request to collect a certain number of digits. The digit map may contain information on how many digits need to be collected and on the types of digits that are supported. In an alternative embodiment, a request for the additional information (e.g., digits) may be made using a SIP Info message. Yet in another embodiment, the BICC protocol may be utilized to collect the additional information in an ATM network.

In response to the request for additional information, the ingress MGC 14 collects the information (e.g., digits) from the originating party and sends a response back to the egress MGC 16 containing the additional information that was collected. In one embodiment, the MGC 14 sends the digit map information in a message to the media gateway 20(1), which then returns the collected information from the user of the terminal device 40 to the ingress MGC 14. Megaco, MGCP, IPDC, or SGCP, for example, may be utilized by the MGC 14 and the media gateway 20(1) to exchange messages. The ingress MGC 14, upon receiving the collected information from the media gateway 20(1), sends it to the egress MGC 16 that requested such information.

In accordance with one embodiment of the present invention, the additional information (e.g., digits) are provided to the egress MGC 16 by the ingress MGC 14 in a SIP-T message in an IP network, or in a BICC message in an ATM network. In an alternative method, the digits may be provided in a SIP-T Info message. At block 350, the egress MGC 16 receives the additional information provided by the ingress MGC 14 either in the SIP-T message or BICC message, in one embodiment, depending on the type of the data network employed.

At the block 320, the egress MGC 16 determines whether additional information is desired. In one embodiment, the steps in the blocks 320–350 may be repeated several times until the desired information has been collected. Once all of the desired information has been collected, the egress MGC 16, using the media gateway 25(1), establishes a call session between the two terminal devices 40, 45. Thus, the call terminates with terminal device 45 once the egress MGC 16 collects the desired information.

In one embodiment, after the call session is established at the block 330, a user of the terminal device 40 at the originating end, for example, may wish to place a new request at block 365. The new request may, for example, be in the form of reset dialing, feature activation, or reorigination. Reset dialing generally refers to a restart of the dialing phase that is currently active. In one embodiment, a "1" or "#" key may be used for reset dialing. Reorigination generally refers to reaccessing a long distance network to dial a new number. Thus, if a user wishes to place a new request at the block 365, additional information, if needed, may be obtained at the block 320 to complete the call.

At block 370, if the call session established at the block 330 is active, then an iterative loop in one embodiment checks to see if the user, at the block 365, makes a new request. When the call session is no longer active, the method of FIG. 3 terminates at block 375. Thus, in one embodiment, the method of FIG. 3 allows for collection of information during calls.

In one embodiment, the ingress MGC 14 may be capable of responding using a SIP-T message (e.g., SIP-T Info message) to indicate that it is unable to collect the requested information. Accordingly, in one embodiment, the ingress MGC 14 may indicate in an SIP-T Info message that the requested information may not be provided.

Figure 4:
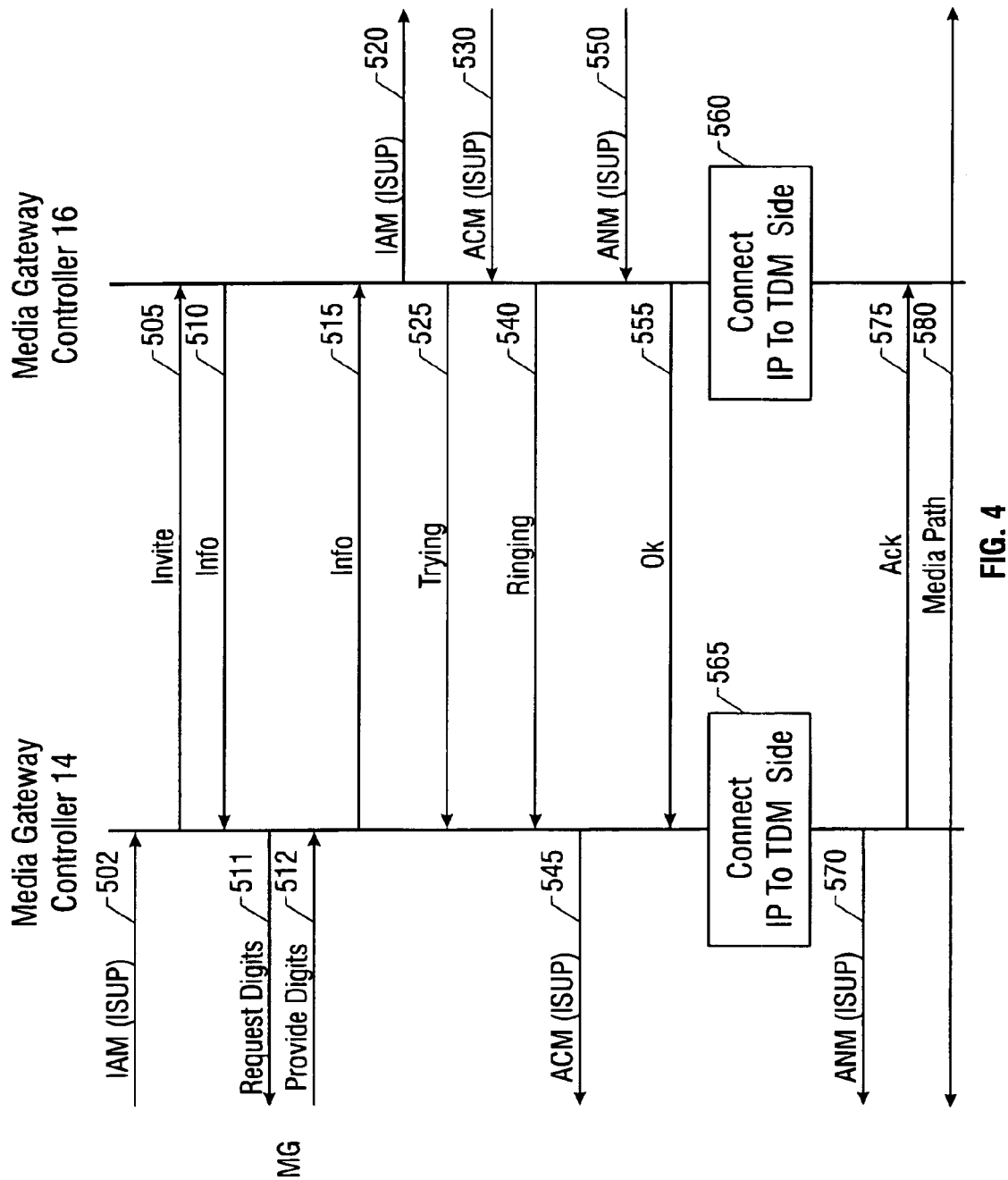
FIG. 4 is a message flow diagram of signaling to establish a call session between two media gateway controllers that may be employed in the communications system of FIG. 1.

Referring to FIG. 4, an embodiment of a message flow diagram of signaling to collect digits and establish a call session is illustrated. In the illustrated embodiment, SIP and/or SIP-T messages are used for establishing a call on the packet-based network 12. In response to the ISUP IAM message (at 502) from the originating switch 18, the ingress MGC 14 encapsulates the ISUP IAM in a SIP-T Invite message and sends the SIP-T Invite request (at 505) to indicate that the receiving node (egress MGC 16) is being invited to participate in a communications session. Upon determining that additional digits are desired before termination, the egress MGC 16 (at 510), sends a request for digits in the information message to the ingress MGC 14. The ingress MGC 14 requests (at 511) the digits from the ingress MG 20(1), which collects the requested digits, and provides them (at 512) to the ingress MGC 14. The ingress MGC 14 then transmits the collected digits (at 515) in an information message to the egress MGC 16.

The egress MGC 16 sends the ISUP IAM message (at 520) to the destination switch 20 in response to receiving the information message containing the requested digits. The egress MGC 16 also returns a SIP-T Trying response (at 525) to indicate that the called entity has located a possible location where the target has registered recently and is trying to alert the target. In one embodiment, the Trying response may be transmitted by the egress MGC 16 before or after the Information message (at 510). The destination switch 20 communicates an ISUP ACM message (at 530) to indicate that the destination switch 20 is serving the called party and that the line is available for ringing. The egress MGC 16 then sends a SIP-T Ringing message that encapsulates the ISUP ACM in the response (at 540) to the ingress MGC 14 to indicate that the egress MGC 16 has located a possible location that the called party has registered at and is trying to alert the called party. In response, the ingress MGC 14 extracts the ISUP ACM from the Ringing message and sends the ISUP ACM message (at 545) to the originating switch 18.

When the called party answers the call, the destination switch 20 sends an ISUP ANM message (at 550) to the egress MGC 16. In response, the egress MGC 16 encapsulates the ISUP ACM in a SIP-T OK message and returns a SIP-T OK response (at 555) to the ingress MGC 14 to indicate that the Invite has been successfully answered. The egress MGC 16 at this point also connects (at 560) the IP side to the TDM side, which connects the bearer channels on the IP and TDM networks for the call session. Upon receiving the OK response, the ingress MGC 14 also connects (at 565) the IP side to the TDM side to connect the bearer channels on the IP and TDM networks. The ingress MGC 14 also send an ISUP ANM message (at 570) to the originating switch 20 as well as sends a SIP-T ACK request (at 575) back to the destination node. A media path (at 580) is established after this.

In accordance with one or more embodiment of the present invention, the Invite, Info, Ringing, Trying, or OK messages may be defined in the SIP standard (as opposed to the SIP-T standard). Thus, whether a particular message is part of the SIP-T, SIP, or any other standard, such a message may still be applicable to one or more embodiments of the present invention.

Some embodiments may have one or more of the following advantages. An efficient method and apparatus are provided for collecting information, such as digits, to establish inter-media gateway controller calls. Creation of a bearer path between the originating network and the terminating network over the packet-based network 12 is no longer necessary before collecting the desired information. That is, digit collection, as an example, may occur before a bearer path or a voice path is established over the data network. And since, in accordance with one or more embodiments of the present invention, the digits may be collected before a bearer path is established, the egress MGC is able to correctly identify the terminating media gateway from a plurality of media gateways under its control. As a result, hairpinning from one media gateway to another may no longer be necessary, which results in savings of network resources, such as network ports.

The various software layers, routines, or modules discussed herein may be executable on control units in corresponding network elements, such as the media gateway controllers 14 or 16. Instructions of such software layers, routines, or modules may be stored on one or more storage devices in the various network elements. A control unit may include a microprocessor, a microcontroller, a processor card (including one or more microprocessors or microcontrollers), or other control or computing devices. As used here, a "controller" refers to hardware or software components or a combination of both.

The storage units referred to in this discussion may include one or more machine-readable storage media for storing data and instructions. The storage media may include different forms or memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy, removable disks; other magnetic media including tape; and optical media such as compact disks (CDs) or digital video disks (DVDs). Instructions that make up the various software layers, routines, or modules in the various systems may be stored in respective storage units. The instructions when executed by a respective control unit cause the corresponding network element to perform programmed acts.

The instructions of the software routines or programs may be loaded or transported into the network element in one of many different ways. For example, code segments including instructions stored on floppy disks, CD or DVD media, a hard disk, or transported through a network interface card, modem, or other interface device may be loaded into the network element and executed as corresponding software layers, routines, or modules. In the loading or transport process, data signals that are embodied in carrier waves (transmitted over telephone lines, network lines, wireless links, cables, and the like) may communicate the code segments, including instructions, to the network node or entity. Such carrier waves may be in the form of electrical, optical, acoustical, electromagnetic, or other types of signals.

While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A method, comprising:
receiving a call request from a first media gateway controller at a second media gateway controller over a network;
determining if at least one digit is required to establish a call session;
requesting the at least one digit from the first media gateway controller in response to determining that the at least one digit is required; and
receiving the at least one digit from the first media gateway controller before establishing a bearer path over the network.

2. The method of claim 1, wherein receiving the call request comprises receiving the call request over a packet-based network.

3. The method of claim 1, wherein receiving the call request comprises receiving the call request over an Asynchronous Transfer Mode network.

4. The method of claim 3, wherein receiving the call request comprises receiving a BICC IAM message.

5. The method of claim 1, wherein receiving the call request comprises receiving the call request over an Internet Protocol network.

6. The method of claim 5, wherein receiving the call request comprises receiving an IAM message encapsulated in a Session Initiation Protocol message.

7. The method of claim 6, wherein requesting the at least one digit comprises requesting the at least one digit in a Session Initiation Protocol message.

8. The method of claim 7, wherein requesting the at least one digit comprises providing a digit map within the Session Initiation Protocol message.

9. The method of claim 1, wherein requesting the at least one digit comprises requesting digits to establish a call session, and wherein receiving the at least one digit comprises receiving the requested digits before establishing the bearer path over the network in response to the call request.

10. The method of claim 1, further including terminating the call in response to receiving the at least one digit.

11. The method of claim 1, wherein receiving the call request comprises receiving a Session Initiation Protocol Invite message containing ISUP initial address message (IAM), wherein requesting and receiving the at least one digit occurs prior to sending a Session Initiation Protocol OK message in response to the Invite message.

12. The method of claim 1, wherein receiving the at least one digit comprises receiving the at least one digit in a Session Initiation Protocol Info message prior to establishing a bearer path over the network in response to the call request.

13. The method of claim 1, wherein receiving the information comprises receiving the at least one digit requested from the first media gateway controller before establishing the bearer path over the network for the call request.

14. An apparatus, comprising:
a first interface coupled to a packet-based network; and
a controller communicatively coupled to the first interface, the controller to:
receive a call request from a media gateway controller over the packet-based network;
determine if at least one digit is required to establish a call session;
request the at least one digit from the media gateway controller; and
receive the at least one digit from the media gateway controller over the packet-based network in response to determining that the at least one digit is required; and
wherein the at least one digit is received before establishing a bearer path over the network.

15. The apparatus of claim 14, wherein the packet-based network comprises one of an Asynchronous Transfer Mode network and an Internet Protocol network.

16. The apparatus of claim 15, wherein the controller is adapted to receive the call request in one of a BICC IAM and Session Initiation Protocol message.

17. The apparatus of claim 13, wherein the controller is adapted to receive the at least one digit in at least one of a Session Initiation Protocol message and a BICC message.

18. The apparatus of claim 13, wherein the controller is adapted to request a digit map within the Session Initiation Protocol message.

19. The apparatus of claim 14, wherein the controller is further adapted to complete the call session in response to receiving the at least one digit.

20. The apparatus of claim 19, wherein the controller is further adapted to receive information during the call session.

21. The apparatus of claim 14, wherein the call request comprises a Session Initiation Protocol Invite message, and wherein the controller is adapted to receive the at least one digit in a Session Initiation Protocol Info message prior to establishing the call session.

22. The apparatus of claim 21, wherein the controller is adapted to receive the at least one digit in a Session Initiation Protocol Info message prior to the controller sending a Session Initiation Protocol OK message in response to the Invite message.

23. An apparatus, comprising:
a first interface to couple to a first network;
a second interface to couple to a packet-based network; and
a controller communicatively coupled to the first and second interfaces, the controller to:
receive a call request over the first network from a terminal;
transmit the call request over the packet-based network to a media gateway controller;
prior to a call session being established in response to the call request, receive a request to collect digits from the media gateway controller over the packet-based network;
collect digits from the terminal; and
transmit the collected digits to the media gateway controller before establishment of a bearer path over the packet based network.

24. The apparatus of claim 23, wherein the first network is a Signaling System #7 network.

25. The apparatus of claim 24, wherein the controller is adapted to receive the call request in an IAM message.

26. The apparatus of claim 23, wherein the packet-based network comprises one of an Asynchronous Transfer Mode network and an Internet Protocol network.

27. The apparatus of claim 23, wherein the controller is adapted to collect the digits from a media gateway over the packet-based network.

28. The apparatus of claim 27, wherein the controller is adapted to collect the digits from the media gateway according to at least one of a Megaco protocol, a media gateway controller protocol, a simple gateway controller protocol, and an Internet protocol device control.

29. The apparatus of claim 23, wherein the controller is adapted to transmit the digits within a Session Initiation Protocol message prior to the call session being established.

30. The apparatus of claim 23, wherein the controller is adapted to receive the request to collect the digits from the media gateway within a Session Initiation Protocol message.

31. The apparatus of claim 23, wherein the controller is further adapted to receive a request to collect digits after establishing a call session.

32. An article comprising at least one machine-readable storage medium containing instructions that when executed cause a processor to:
receive a request to establish a call session over a packet-based network from a media gateway controller;
determine if at least one digit is required to establish the call session;
request the at least one digit from the media gateway controller in response to determining that the at least one digit is required; and
receive the at least one digit from the media gateway controller before establishing a bearer path over the packet-based network.

33. The article of claim 32, wherein the instructions when executed cause the processor to receive the request over one of an Asynchronous Transfer Mode network and an Internet Protocol network.

34. The article of claim 32, wherein the instructions when executed cause the processor to receive the request in one of a BICC IAM and Session Initiation Protocol message.

35. The article of claim 32, wherein the instructions when executed cause the processor to request the at least one digit in a Session Initiation Protocol message.

36. The article of claim 32, wherein the instructions when executed cause the processor to receive the at least one digit in a Session Initiation Protocol message before establishing a bearer path over the packet-based network.

37. The article of claim 36, wherein receiving the at least one digit in a Session Initiation Protocol message comprises receiving the at least one digit in a Session Initiation Protocol Info message before establishing a bearer path over the packet-based network.

38. The article of claim 32, wherein the instructions when executed cause the processor to establish the bearer path over the packet-based network after receiving the at least one digit.

39. The article of claim 32, wherein the instructions when executed caused the processor to receive a request for information after establishing the bearer path over the packet-based network.

40. The article of claim 32, wherein the request comprises a Session Initiation Protocol Invite message, and wherein requesting the at least one digit from the media gateway controller comprises sending a Session Initiation Protocol Info message to the media gateway controller prior to establishing a call session in response to the Invite message.

41. An article comprising at least one storage medium comprising instructions that when executed cause a processor to:
receive a call request from a media gateway controller over a packet-based network;
determine if at least one digit is required to establish a call session;
request the at least one digit from the media gateway controller in response to determining the at least one digit is required;
receive the at least one digit in one of a BICC and a Session Initiation Protocol message from the media gateway controller before establishing a bearer path over the packet-based network in response to the call request.

42. The article of claim 41, wherein the call request comprises a Session Initiation Protocol Invite message, and wherein receiving the at least one digit comprises receiving the at least one digit in a Session Initiation Protocol Info message prior to establishing a call session in response to the Invite message.

* * * * *